(12) United States Patent
Yeo

(10) Patent No.: US 9,955,079 B2
(45) Date of Patent: *Apr. 24, 2018

(54) LENS DRIVING APPARATUS AND CAMERA MODULE INCLUDING FUNCTION OF SHAKING COMPENSATION

(71) Applicant: LG INNOTEK CO., LTD., Seoul (KR)

(72) Inventor: In Jae Yeo, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/257,981

(22) Filed: Sep. 7, 2016

(65) Prior Publication Data

US 2016/0381295 A1  Dec. 29, 2016

Related U.S. Application Data

(63) Continuation of application No. 14/415,764, filed as application No. PCT/KR2013/005990 on Jul. 5, 2013, now Pat. No. 9,467,624.

(30) Foreign Application Priority Data

Jul. 20, 2012 (KR) ........................ 10-2012-0079579

(51) Int. Cl.
*H04N 5/232* (2006.01)
*G03B 5/02* (2006.01)
(Continued)

(52) U.S. Cl.
CPC ......... *H04N 5/23287* (2013.01); *G02B 7/023* (2013.01); *G02B 27/646* (2013.01);
(Continued)

(58) Field of Classification Search
CPC ........... H04N 5/23248; H04N 5/23287; H04N 5/2251; G03B 5/00
See application file for complete search history.

(56) References Cited

U.S. PATENT DOCUMENTS 8,238,734 B2 * 8/2012 Chiang ................ H04N 5/2254
348/340
8,314,841 B2 * 11/2012 Chiu ........................ G03B 5/00
348/208.11

(Continued)

FOREIGN PATENT DOCUMENTS

KR   10-2010-0109331   10/2010
KR   10-1069619         10/2011

OTHER PUBLICATIONS

International Search Report dated Oct. 17, 2013 issued in Application No. PCT/KR2013/005990.
(Continued)

*Primary Examiner* — Ahmed A Berhan
(74) *Attorney, Agent, or Firm* — KED & Associates, LLP

(57) ABSTRACT

Disclosed is a camera module. The camera module includes a lens barrel disposed in a housing to receive a lens; and a driving unit moving the lens barrel relative to the housing, wherein the driving unit comprises: a first driving unit in the lens barrel; and a second driving unit in the housing, and wherein the lens barrel comprises a central area on which the lens is disposed; and a peripheral area surrounding the central area, in which the first driving unit is disposed in the peripheral area. The camera module includes a lens barrel disposed in a housing to receive a lens; and a plurality of driving units moving the lens barrel relative to the housing, wherein a first direction is defined perpendicularly to an optical axis of the lens, a second direction is defined perpendicularly to the optical axis of the lens and the first direction, and the driving units including coils and moving the lens barrels in the same direction along the first direction or the second direction have coil winding directions corresponding to each other.

20 Claims, 6 Drawing Sheets

(51) Int. Cl.
*G02B 27/64* (2006.01)
*G02B 7/02* (2006.01)
*G03B 3/10* (2006.01)
*G03B 5/00* (2006.01)

(52) U.S. Cl.
CPC ............ *G03B 3/10* (2013.01); *G03B 5/00* (2013.01); *G03B 5/02* (2013.01); *H04N 5/23258* (2013.01); *G03B 2205/0015* (2013.01); *G03B 2205/0046* (2013.01); *G03B 2205/0069* (2013.01)

(56) References Cited

U.S. PATENT DOCUMENTS

| | | | |
|---|---|---|---|
| 8,866,919 B2 * | 10/2014 | Ahn | G03B 5/00 348/208.7 |
| 2011/0122267 A1 | 5/2011 | Ahn et al. | |
| 2012/0044370 A1 | 2/2012 | Ku | |
| 2013/0089311 A1 | 4/2013 | Jung et al. | |

OTHER PUBLICATIONS

U.S. Office Action dated Feb. 9, 2016 issued in co-pending U.S. Appl. No. 14/415,764.
U.S. Notice of Allowance dated Jun. 8, 2016 issued in co-pending U.S. Appl. No. 14/415,764.

\* cited by examiner

[Fig. 1]
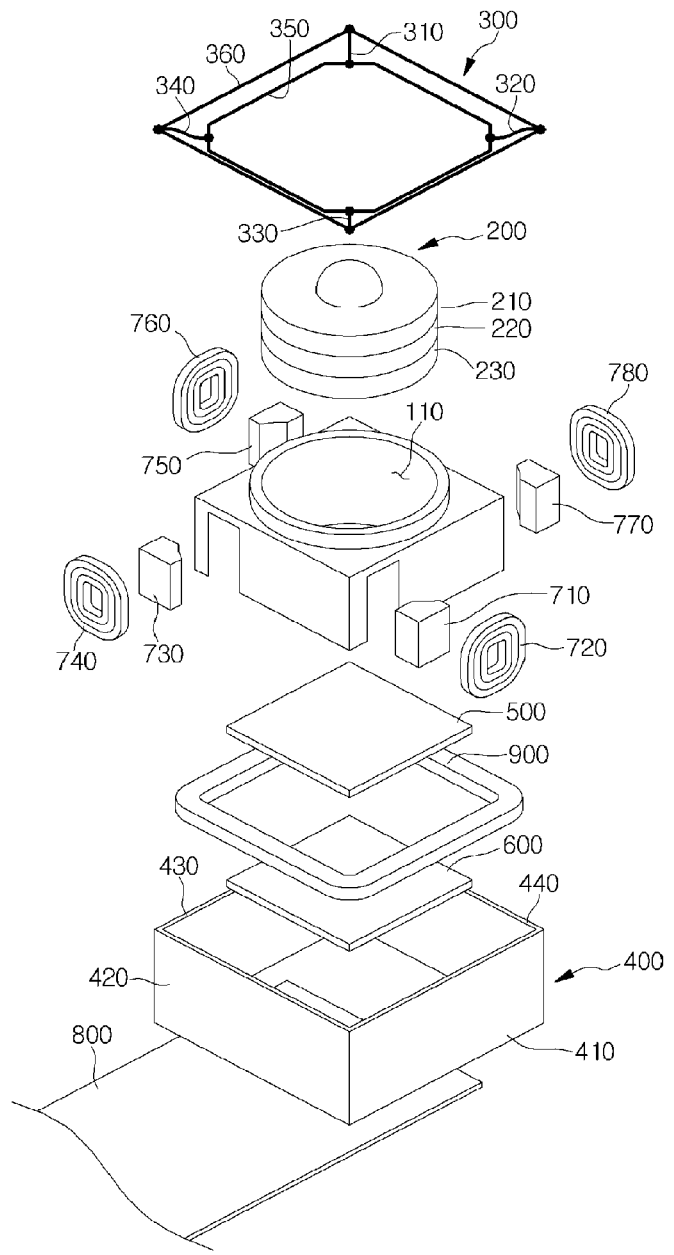

[Fig. 2]
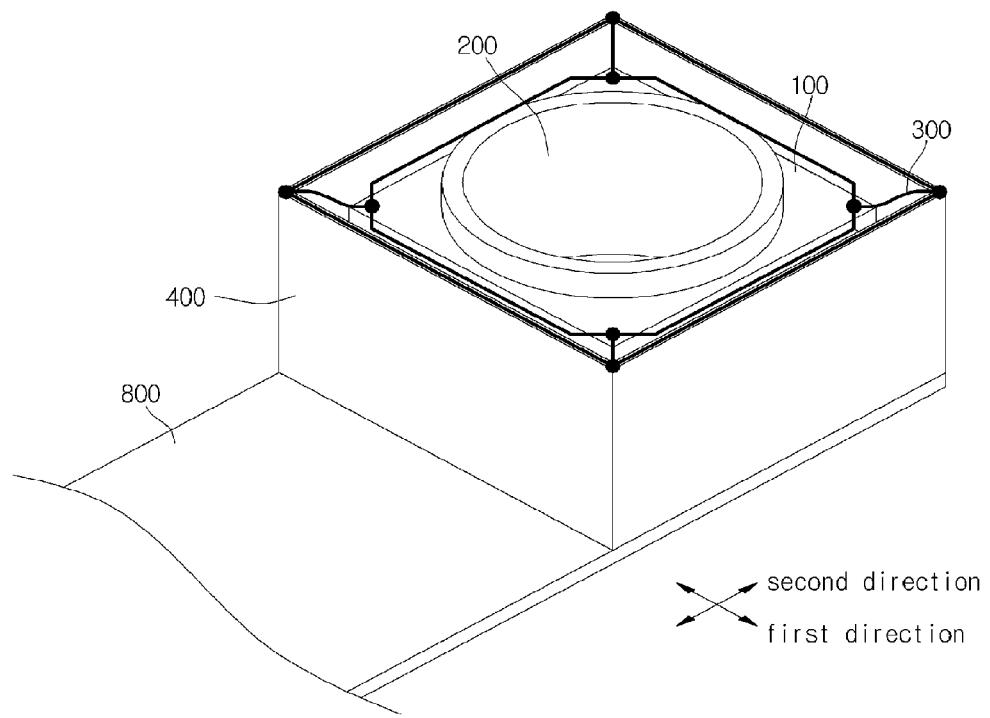
[Fig. 3]
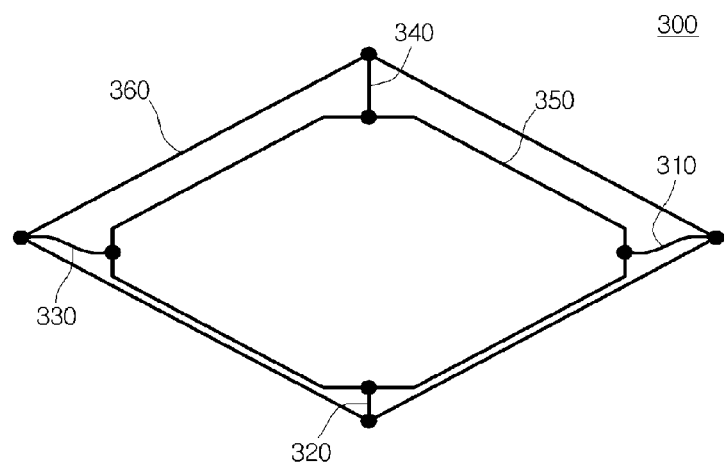

[Fig. 4]
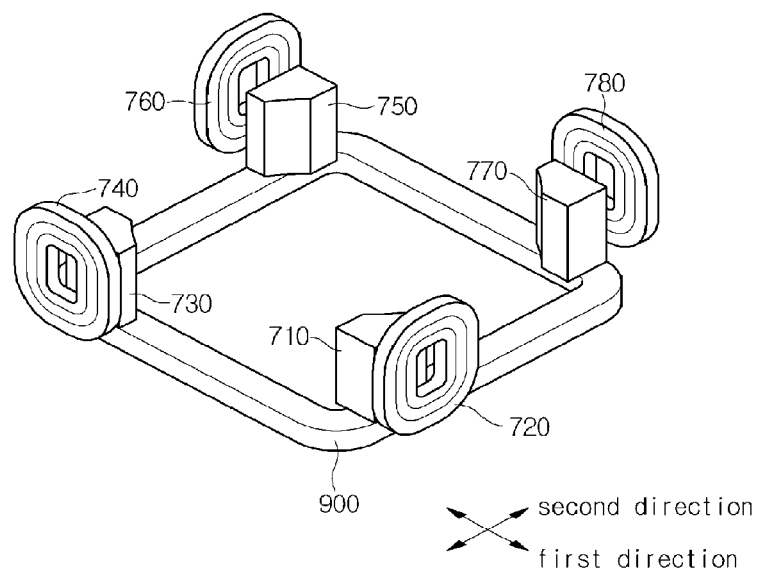
[Fig. 5]
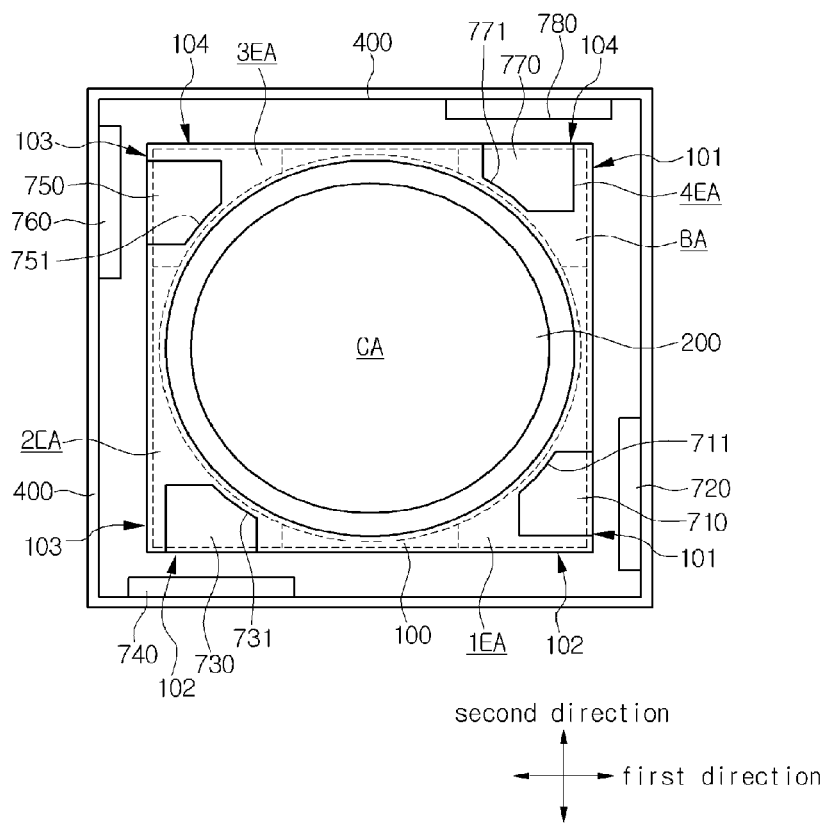

[Fig. 6]
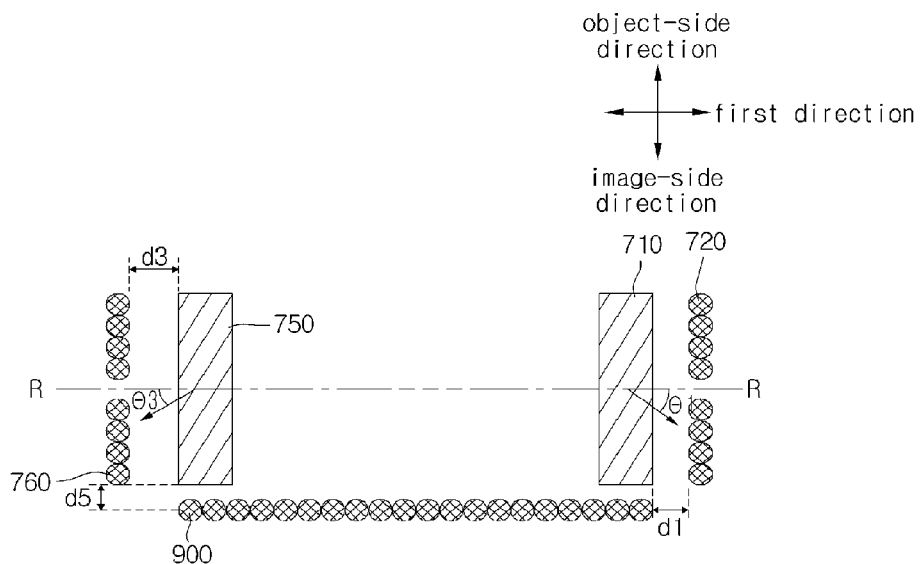
[Fig. 7]
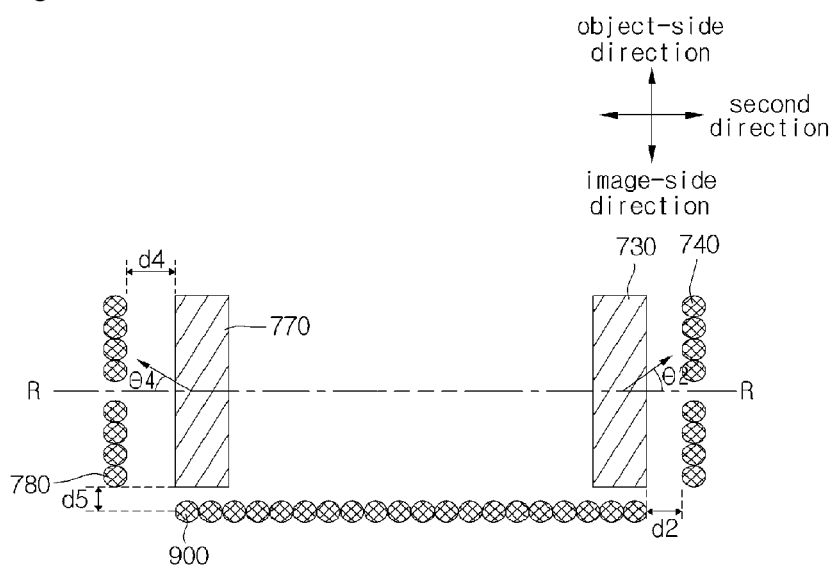

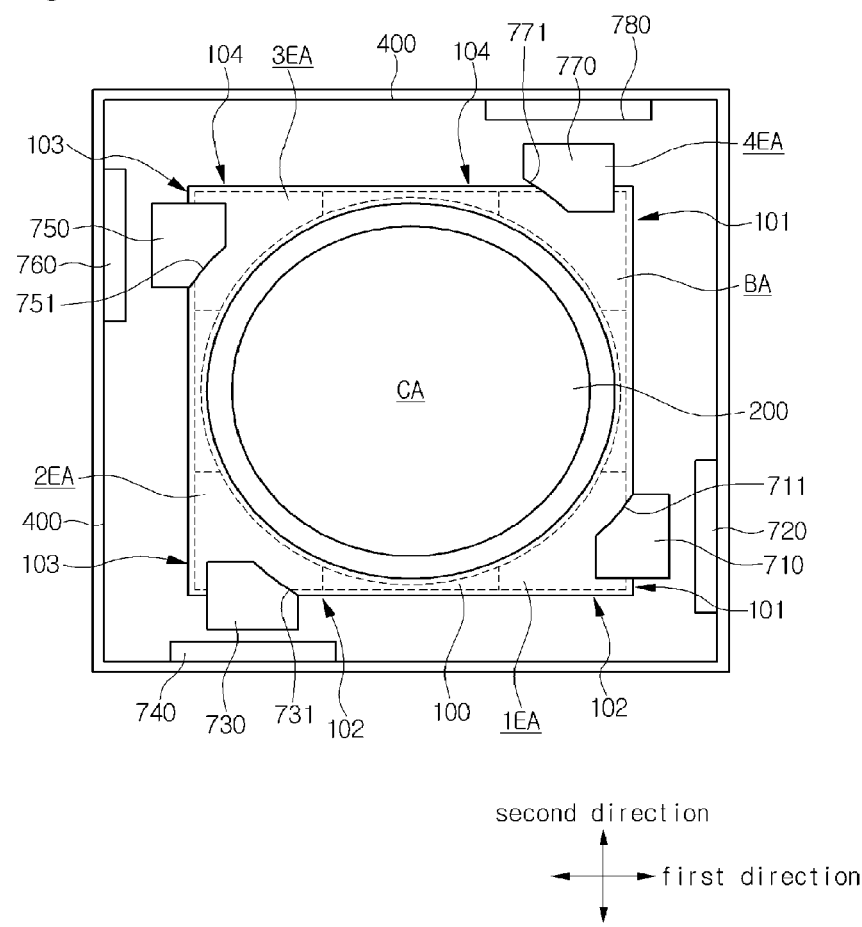

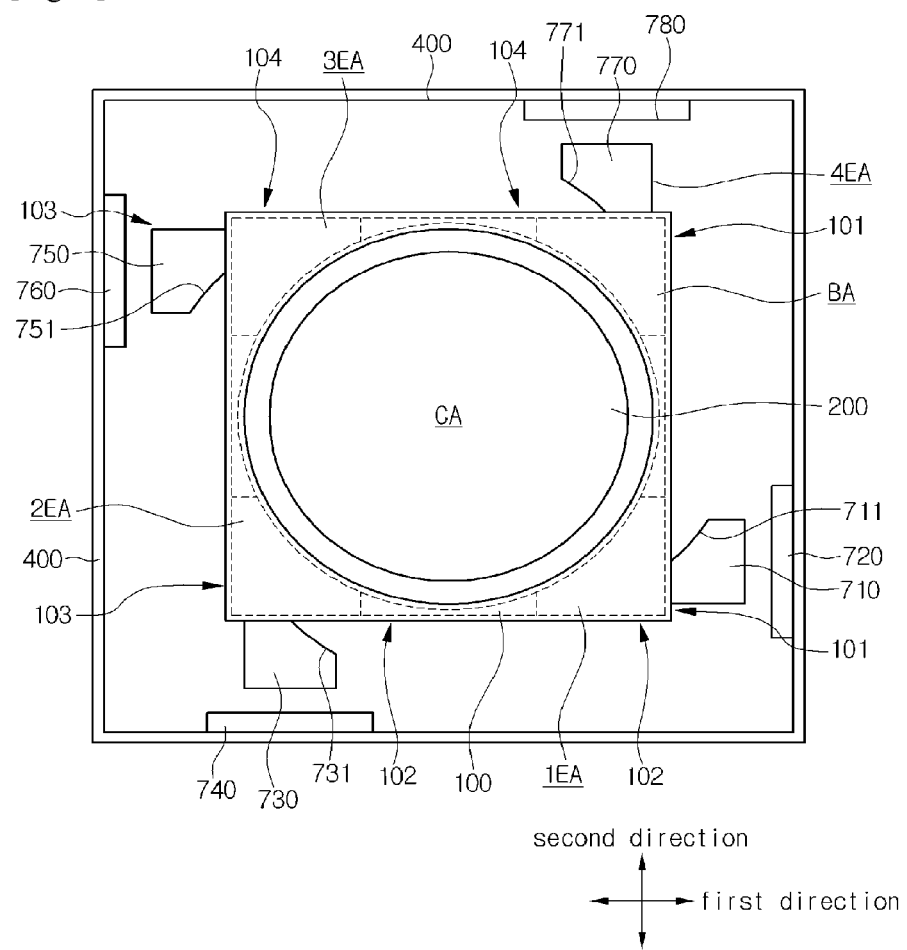
[Fig. 9]

LENS DRIVING APPARATUS AND CAMERA MODULE INCLUDING FUNCTION OF SHAKING COMPENSATION

This application is a Continuation application of U.S. application Ser. No. 14/415,764, filed on Jan. 20, 2015, which is a U.S. National Stage Application under 35 U.S.C. § 371 of PCT Application No. PCT/KR2013/005990, filed Jul. 5, 2013, which claims priority to Korean Patent Application No. 10-2012-0079579, filed Jul. 20, 2012, whose entire disclosures are hereby incorporated by reference.

TECHNICAL FIELD

The embodiment relates to a camera module.

BACKGROUND ART

Recently, a camera module has been installed in a mobile communication terminal, an information technology (IT) device, such as a PDA or an MP3 player, a vehicle, and an endoscope. As the technology has been developed toward the high-pixel camera module from the conventional VGA camera equipped with 0.3 mega pixels, the camera module has been manufactured in a small size with a slim structure according to targets to which the camera module is installed. In addition, the camera module has been equipped with various additional functions, such as auto-focusing or optical zoom functions, at the low manufacturing cost.

Meanwhile, the camera module manufactured in these days is equipped with an image sensor module, which is manufactured through a COB (chip of board) scheme, a COF (chip of flexible) scheme or a CSP (chip scale package) scheme, and is usually connected to a main substrate through an electric connection unit, such as a PCB (printed circuit board) or an FPCB (flexible printed circuit board).

However, users recently request the camera module, which can be directly mounted on the main substrate similar to a general passive element, in such a manner that the manufacturing process for the camera module can be simplified while reducing the manufacturing cost.

The camera module is generally manufactured by attaching an image sensor, such as a CCD or a CMOS, to a substrate through a wire bonding scheme or a flip chip scheme. An image of a subject is focused by the image sensor and the focused image is stored as data in a memory, which is installed inside or outside the camera module. In addition, the stored data are converted into electric signals and the electric signals are displayed as images through a display medium, such as an LCD or a PC monitor provided in a device.

A camera module according to the related art includes a housing, an image sensor supported on a bottom of the housing to convert an image signal received through a lens into an electric signal, a lens group to focus an image signal of a subject to the image sensor, and a barrel in which the lens group are stacked. The housing, the lens group and the barrel are sequentially coupled with each other.

In addition, an FPCB mounted thereon with chip components, which are electric components serving as a condenser and a resistor to drive the image sensor including a CCD or a CMOS, is electrically connected to the bottom of the housing.

In the camera module having the above structure according to the related art, in a state that a plurality of circuit components have been mounted on the FPCB, an ACF (anisotropic conductive film) is inserted between the substrate and the image sensor, and heat and pressure are applied thereto in such a manner that the substrate, the image sensor and the ACF are fixedly bonded and conducted with each other and an IR cut-off filter is attached to an opposite side.

In addition, in a state that the barrel provided therein with a plurality of lens groups is temporally screw-coupled with the housing, as described above, the assembled PCB used for mounting devices is fixedly bonded to the bottom of the housing by an adhesive.

Meanwhile, after the PCB, to which the image sensor is attached, has been fixedly bonded to the housing coupled with the barrel, a focus adjustment is carried out with respect to a subject (resolution chart) located in front of the barrel and spaced apart from the barrel by a predetermined distance. At this time, the focus adjustment of the camera module can be achieved between the lens group and the image sensor while adjusting the vertical displacement by rotating the barrel screw-coupled with the housing.

DISCLOSURE OF INVENTION

Technical Problem

The embodiment provides a camera module capable of effectively preventing hand-shaking.

Solution to Problem

According to the embodiment, there is provided a camera module including a lens barrel disposed in a housing to receive a lens; and a driving unit moving the lens barrel relative to the housing, wherein the driving unit comprises: a first driving unit in the lens barrel; and a second driving unit in the housing, and wherein the lens barrel comprises a central area on which the lens is disposed; and a peripheral area surrounding the central area, in which the first driving unit is disposed in the peripheral area.

According to the embodiment, there is provided a camera module including a lens barrel disposed in a housing to receive a lens; and a plurality of driving units moving the lens barrel relative to the housing, wherein a first direction is defined perpendicularly to an optical axis of the lens, a second direction is defined perpendicularly to the optical axis of the lens and the first direction, and the driving units including coils and moving the lens barrels in a same direction along the first direction or the second direction have coil winding directions corresponding to each other.

Advantageous Effects of Invention

The camera module according to the embodiment can diminish the increase of the thickness and reduce the volume of the camera module by installing the driving unit using a space of the lens barrel. That is, the installation area of the driving unit in the radial direction from the lens barrel may be diminished, so that the size of the camera module can be reduced by about 30% or more based on the size of the conventional camera module having the function identical to the function of the camera module according to the embodiment.

The camera module according to the embodiment can compensate for hand-shaking by driving the lens barrel with respect to the housing. That is, the driving unit can compensate for hand-shaking by moving the lens barrel relative to the housing.

In particular, the camera module according to the embodiment moves the lens barrel by applying magnetic force in the direction inclined with respect to the reference horizontal plane. Thus, the camera module according to the embodiment can move the lens barrel in the 3-axis directions. Therefore, the camera module according to the embodiment can compensate for the shaking in the left and right directions and can adjust the focus.

BRIEF DESCRIPTION OF DRAWINGS

FIG. 1 is an exploded perspective view showing a camera module according to the embodiment.

FIG. 2 is a perspective view showing a camera module according to the embodiment.

FIG. 3 is a view showing an elastic member.

FIG. 4 is a perspective view showing a driving unit.

FIG. 5 is a longitudinal sectional view of a camera module according to the embodiment.

FIG. 6 is a view showing a portion of the driving unit.

FIG. 7 is a view showing another portion of the driving unit.

FIG. 8 is a longitudinal sectional view of a camera module according to the embodiment.

FIG. 9 is a longitudinal sectional view of a camera module according to the embodiment.

MODE FOR THE INVENTION

In the description of the embodiments, it will be understood that when each layer (film), region, pattern, or structure is referred to as being "on" or "under" another substrate, layer (film), region pad or pattern, it can be "directly" or "indirectly" on the other substrate, layer (film), region pad or pattern or one or more intervening layers may also be present. Such a position has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, embodiments will be described in detail with reference to accompanying drawings.

FIG. 1 is an exploded perspective view showing a camera module according to the embodiment. FIG. 2 is a perspective view showing a camera module according to the embodiment. FIG. 3 is a view showing an elastic member. FIG. 4 is a perspective view showing a driving unit. FIG. 5 is a longitudinal sectional view of a camera module according to the embodiment. FIG. 6 is a view showing a portion of the driving unit. FIG. 7 is a view showing another portion of the driving unit. FIG. 8 is a longitudinal sectional view of a camera module according to the embodiment. FIG. 9 is a longitudinal sectional view of a camera module according to the embodiment.

Referring to FIGS. 1 to 7, the camera module according to the embodiment includes a lens barrel 100, a lens assembly 200, an elastic member 300, a housing 400, an IR cut-off filter unit 500, a sensor unit 600, a circuit board 800, driving units 710, 720 . . . and 700N and a lower coil 900.

The lens barrel 100 receives the lens assembly 200 therein.

The lens barrel 100 has a receiving groove 110 for receiving the lens assembly 200. The receiving groove 110 may have a shape corresponding to a shape of the lens assembly 200. When viewed from the bottom, the receiving groove 110 may have a circular shape. In detail, when viewed from the bottom, the receiving groove 110 may have a circular shape. That is, the outer portion of the receiving groove 110 may have a circular shape. In addition, the outer portion of the receiving groove 110 may have a rectangular shape.

The lens barrel 100 may have a rectangular shape. That is, the outer portion of the lens barrel 100 may have a rectangular shape.

The lens barrel 100 may be connected with the housing 400. In detail, the lens barrel 100 is connected to the housing 400 through the elastic member 300. That is, the lens barrel 100 may be movably connected to the housing 400 by the elastic member 300.

In addition, the lens barrel 100 includes a light incident groove, which is open upward (toward an object). The light incident groove exposes the lens assembly 200. An image is incident into the lens assembly 200 through the light incident groove.

The lens assembly 200 is disposed in the lens barrel 100. In detail, the lens assembly 200 is disposed in the receiving groove 110. The lens assembly 200 is inserted into the receiving groove 110. The lens assembly 200 may have a first outer profile. In detail, the lens assembly 200 may have a circular outer profile. In more detail, the lens assembly may have a circular shape when viewed from the top. In addition, the lens assembly 200 may have a rectangular shape when viewed from the top.

The lens assembly 200 includes a plurality of lenses 210, 220 and 230. For instance, the lens assembly 200 may include a first lens 210, a second lens 220, and a third lens 230. The third lens 230, the second lens 220, and the first lens 210 may be sequentially laminated.

Further, a first spacer 221 and a second spacer 222 may be interposed among the lenses 210, 220 and 230. The lenses 210, 220 and 230 are spaced apart from each other through the first spacer 221 and the second spacer 222.

Although it has been described that the lens assembly 200 includes three lenses, the embodiment is not limited thereto. That is, the lens assembly 200 may include one or two lenses or at least four lenses.

The elastic member 300 is disposed in the housing 400. The elastic member 300 is fixed to the housing 400. Further, the elastic member 300 is fixed to the lens barrel 100. The elastic member 300 movably fixes the lens barrel 100 to the housing 400.

Although only one elastic member 300 is illustrated in the drawing, the embodiment is not limited thereto. For instance, another elastic member 300 may be interposed between the lens barrel 100 and the circuit board 800 to movably fix the lens barrel 100.

The elastic member 300 may include a spring. In detail, the elastic member 300 may include a leaf spring. The elastic member 300 may include four elastic sections 310, 320, 330 and 340. For instance, the elastic member 300 may include a first elastic section 310, a second elastic section 320, a third elastic section 330 and a fourth elastic section 340.

One end of the first elastic section 310 is fixed to the lens barrel 100 and the other end of the first elastic section 310 is fixed to the housing 400.

In addition, one end of the second elastic section 320 is fixed to the lens barrel 100 and the other end of the second elastic section 320 is fixed to the housing 400.

Further, one end of the third elastic section 330 is fixed to the lens barrel 100 and the other end of the third elastic section 330 is fixed to the housing 400.

In addition, one end of the fourth elastic section 340 is fixed to the lens barrel 100 and the other end of the fourth elastic section 340 is fixed to the housing 400.

The elastic member 300 may further include a first fixing link 350 and a second fixing link 360.

The first fixing link 350 surrounds the outer peripheral portion of the receiving groove 110 of the lens barrel 100. The first fixing link 350 is connected to one end of the first elastic section 310, one end of the second elastic section 330, one end of the third elastic section 330 and one end of the fourth elastic section 340.

The first fixing link 350 may be fixed to the lens barrel 100. In addition, the first fixing link 350 may fix the position of the first to fourth elastic sections 310 to 340.

The second fixing link 360 is disposed along sidewalls 410, 420, 430 and 440 of the housing 400. The second fixing link 360 is connected to the other end of the first elastic section 310, the other end of the second elastic section 320, the other end of the third elastic section 330 and the other end of the fourth elastic section 340.

The second fixing link 360 may be fixed to the housing 400. In addition, the second fixing link 360 may fix the position of the first to fourth elastic sections 310 to 340.

The housing 400 receives the lens barrel 100, the sensor unit 600 and the IR cut-off filter unit 500. The housing 400 is connected to the lens barrel 100 through the elastic member 300.

The housing 400 may include plastic or metal. The housing 400 may have a rectangular container shape. For instance, the housing 400 may include four sidewalls 410, 420, 430 and 440. The sidewalls 410, 420, 430 and 440 may surround the lens barrel 100.

The sidewalls 410, 420, 430 and 440 may be integrally formed with each other. The sidewalls 410, 420, 430 and 440 may face the outer surfaces of the lens barrel 100, respectively. The sidewalls 410, 420, 430 and 440 may include a first sidewall 410, a second sidewall 420, a third sidewall 430 and a fourth sidewall 440.

Although not shown in the drawings, a cover section may be further provided. The cover section extends from the sidewalls 410, 420, 430 and 440 to cover the lens barrel 100. The cover section may include an opening area to partially expose the lenses 210, 220 and 230.

The housing 400 is fixed to the circuit board 800. The housing 400 may be coupled with the circuit board 800.

The IR cut-off filter unit 500 is disposed in the housing 400. The IR cut-off filter unit 500 is fixed to the circuit board 800 and may be fixed to the housing 400. The IR cut-off filter unit 500 filters an incident IR. The IR cut-off filter unit 500 may filter light having an excessively long wavelength introduced into the sensor unit 600.

The IR cut-off filter unit 500 may be formed by alternately depositing titanium oxide and silicon oxide on optical glass. In order to cut-off the IR, thicknesses of the titanium oxide and the silicon oxide may be suitable adjusted.

The sensor unit 600 is received in the housing 400. The sensor unit 600 includes a CCD image sensor or a CMOS image sensor. In addition, the sensor unit 600 further includes the circuit board 800 connected to the image sensor. The sensor unit 600 converts an incident image into an electrical signal.

The sensor unit 600 is fixed to the circuit board 800. The sensor unit 600 may be mounted on the circuit board 800. The sensor unit 600 is electrically connected to the circuit board 800.

The circuit board 800 may cover a bottom of the housing 400. The circuit board 800 is coupled with the housing 400.

The circuit board 800 may include a printed circuit board (PCB). The circuit board 800 may be electrically connected to the sensor unit 600. The circuit board 800 may apply a signal for driving the sensor unit 600. Further, the circuit board 800 may receive a signal from the sensor unit 600.

The sensor unit 600 is mounted on the circuit board 800. In detail, the sensor unit 600 may be fixed to the circuit board 800. That is, the sensor unit 600 may be fixed to the housing 400 through the circuit board 800.

Further, the circuit board 800 may be electrically connected to the driving units 710, 720 . . . and 700N. That is, a signal for driving the driving units 710, 720 . . . and 700N may be applied to the driving units 710, 720 . . . 700N through the circuit board 800.

The driving units 710, 720 . . . and 700N drive the lens barrel 100 with respect to the housing 400. The driving units 710, 720 . . . and 700N drive the lens barrel 100 relative to the housing 400. In more detail, the driving units 710, 720 . . . and 700N may drive the lens barrel 100 in 3-axis directions relative to the housing 400.

The driving units 710, 720 . . . and 700N may move the lens barrel 100 relative to the housing 400 by magnetic force. At this time, the magnetic force is applied in the direction inclined with respect to the optical axis OA of the lens assembly 200.

The driving units 710, 720 . . . and 700N may include a first driving unit 710, a second driving unit 720, a third driving unit 730, a fourth driving unit 740, a fifth driving unit 750, a sixth driving unit 760, a seventh driving unit 770, and an eighth driving unit 780.

A reference horizontal plane R, which is perpendicular to the optical axis OA of the lens assembly 200, may be defined. The reference horizontal plane R may pass through the center of the first driving unit 710. The reference horizontal plane R may divide the first driving unit 710 into two half parts.

In addition, an object-side direction may be defined toward the object of the lens assembly 200 in the optical axis OA direction, that is, an upward direction in the drawing. In addition, an image-side direction may be defined toward the sensor unit 600 directed to the image of the lens assembly 200 in the optical axis OA direction, that is, the downward direction in the drawing.

In addition, the first direction may be defined in the direction perpendicular to the optical axis OA as well as the first and fifth driving units 710 and 750. Further, the second direction may be defined in the direction perpendicular to the optical axis OA as well as the third and seventh driving units 730 and 770.

The first direction may be perpendicular to the second direction.

In addition, the object-side direction is defined with a positive angle and the image-side direction is defined with a negative angle about the reference horizontal plane R. That is, if the directional vector is biased to the object-side direction about the reference horizontal plane R, it is defined with the positive angle. Further, if the directional vector is biased to the image-side direction about the reference horizontal plane R, it is defined with the negative angle.

The first driving unit 710 is fixed to the lens barrel 100. In detail, the first driving unit 710 is fixed to the inner portion of the lens barrel 100. In more detail, the first driving unit 710 may be formed on the inner peripheral surface of the lens barrel 100.

Meanwhile, the lens barrel 100 includes a central area CA where the lens assembly 200 is disposed and a peripheral area BA surrounding the central area CA, in which the first driving unit 710 is disposed in the peripheral area BA. In detail, the lens barrel 100 includes a first surface 101 and a second surface 102 connected to the first surface 101 and includes a first edge portion 1EA formed between an edge where the first surface 101 meets the second surface 102 and the lens assembly 200. The first driving unit 710 is disposed at the first edge portion 1EA and one surface of the first driving unit 710 makes contact with the first surface 101.

However, the embodiment is not limited to the above. Referring to FIG. 8, a portion of the first driving unit 710 may be disposed at the first edge portion 1EA. That is, a portion of the first driving unit 710 may be disposed at the first edge portion 1EA of the lens barrel 100 and remaining portions of the first driving unit 710 may be disposed out of the lens barrel 100. Further, referring to FIG. 9, the first driving unit 710 may be disposed out of the lens barrel 100. In this case, the first driving unit 710 may be disposed corresponding to the first edge portion 1EA of the lens barrel 100.

The first driving unit 710 may include a magnetic material. The first driving unit 710 may be formed by the magnetic material. The first driving unit 710 may include iron oxide, CoFe2O4 or ferrite.

The first driving unit 710 includes a facing surface 711 that faces the lens assembly 200 and the facing surface 711 may have a curvature. That is, the facing surface 711 may be a concave surface formed along a peripheral surface of the lens assembly 200. However, the embodiment is not limited to the above. For instance, the first driving unit 710 may have a polygonal column shape, such as a pentagonal column shape.

Since the first driving unit 710 is disposed in the peripheral area BA, the space of the lens barrel 100 can be sufficiently utilized and the thickness increase due to the first driving unit 710 can be diminished, so that the total volume of the camera module can be reduced.

The magnetization direction of the first driving unit 710 may be inclined with respect to the optical axis OA. In addition, the magnetization direction of the first driving unit 710 may be inclined with respect to the first direction. Further, the magnetization direction of the first driving unit 710 may be inclined with respect to the reference horizontal plane R. In detail, the magnetization direction of the first driving unit 710 may be set between the first direction and the image-side direction. That is, the magnetization direction of the first driving unit 710 may be located in a plane defined by the first direction and the image-side direction.

An angle .theta.1 between the magnetization direction of the first driving unit 710 and the reference horizontal plane R is in the range of about −20° to about −70°. In detail, the angle .theta.1 between the magnetization direction of the first driving unit 710 and the reference horizontal plane R is in the range of about −30° to about −50°.

The second driving unit 720 is fixed to the housing 400. In detail, the second driving unit 720 may be disposed inside the housing 400. In addition, the second driving unit 720 may be disposed outside the housing 400. The second driving unit 720 may be disposed at the first sidewall 410.

The second driving unit 720 faces the first driving unit 710. In addition, the first and second driving units 710 and 720 are spaced apart from each other while facing each other. The second driving unit 720 may be parallel to the first driving unit 710. A distance d1 between the first and second driving units 710 and 720 is in the range of about 50 μm to about 1000 μm, in detail, about 100 μm to about 500 μm.

The center of the second driving unit 720 may correspond to the center of the first driving unit 710. However, the embodiment is not limited thereto and the center of the second driving unit 720 may deviate from the center of the first driving unit 710 by about .+−.20%.

The second driving unit 720 may include a coil. That is, the second driving unit 720 may be prepared in the form of a coil. In this case, the coil of the second driving unit 720 is wound about an axis extending in the first direction. In addition, the coil of the second driving unit 720 may be electrically connected to the circuit board 800.

Attractive force or repulsive force may be generated between the first and second driving units 710 and 720. The second driving unit 720 may apply the attractive force or repulsive force to the first driving unit 710. Since the attractive force or repulsive force has the relative concept, the application of the attractive force or repulsive force from the second driving unit 720 to the first driving unit 710 is substantially identical to the application of the attractive force or repulsive force from the first driving unit 710 to the second driving unit 720.

The second driving unit 720 may apply attractive force or repulsive force to the first driving unit 710 in a direction inclined with respect to the reference horizontal plane R. In this case, the second driving unit 720 may apply the magnetic force to the first driving unit 710 at an angle of about +20° to about +70° with respect to the reference horizontal plane R. In detail, the second driving unit 720 may apply the magnetic force to the first driving unit 710 at an angle of about +30° to about +50° with respect to the reference horizontal plane R.

In addition, the second driving unit 720 may apply the magnetic force to the first driving unit 710 in the first direction as well as the object-side direction. That is, the second driving unit 720 may apply the magnetic force to the first driving unit 710 in the lateral upward direction.

The force direction of the first and second driving units 710 and 720 corresponds to the first direction. In detail, the coil of the second driving unit 720 may be wound such that the force direction of the first and second driving units 710 and 720 may correspond to the first direction. In addition, the coil of the second driving unit 720 may be wound in the magnetization direction of the first driving unit 710.

The third driving unit 730 is fixed to the lens barrel 100. In detail, the third driving unit 730 is fixed inside the lens barrel 100. In more detail, the third driving unit 730 is formed at an inner peripheral portion of the lens barrel 100.

Meanwhile, the third driving unit 730 is disposed on the peripheral area BA. In detail, the lens barrel 100 further includes a third surface 103 facing the first surface 101 and a second edge portion 2EA formed between an edge where the second surface 102 meets the third surface 103 and the lens assembly 200. The third driving unit 730 is disposed at the second edge portion 2EA and one surface of the third driving unit 730 makes contact with the second surface 102.

However, the embodiment is not limited to the above. Referring to FIG. 8, a portion of the third driving unit 730 may be disposed at the second edge portion 2EA. That is, a portion of the third driving unit 730 may be disposed at the second edge portion 2EA of the lens barrel 100 and remaining portions of the third driving unit 730 may be disposed out of the lens barrel 100. Further, referring to FIG. 9, the third driving unit 730 may be disposed out of the lens barrel 100. In this case, the third driving unit 730 may be disposed corresponding to the second edge portion 2EA of the lens barrel 100.

The third driving unit 730 may include a magnetic material. The third driving unit 730 may be formed by using the magnetic material. The third driving unit 730 may include iron oxide, CoFe2O4 or ferrite.

The third driving unit 730 includes a facing surface 731 that faces the lens assembly 200 and the facing surface 731 may have a curvature. That is, the facing surface 731 may be a concave surface formed along a peripheral surface of the lens assembly 200. However, the embodiment is not limited to the above. For instance, the third driving unit 730 may have a polygonal column shape, such as a pentagonal column shape.

Since the third driving unit 730 is disposed in the peripheral area BA, the space of the lens barrel 100 can be sufficiently utilized and the thickness increase due to the third driving unit 730 can be diminished, so that the total volume of the camera module can be reduced.

The magnetization direction of the third driving unit 730 may be inclined with respect to the optical axis OA. In addition, the magnetization direction of the third driving unit 730 may be inclined with respect to the second direction. Further, the magnetization direction of the third driving unit 730 may be inclined with respect to the reference horizontal plane R. In detail, the magnetization direction of the third driving unit 730 may be set between the second direction and the object-side direction. That is, the magnetization direction of the third driving unit 730 may be located in a plane defined by the second direction and the object-side direction.

An angle .theta.2 between the magnetization direction of the third driving unit 730 and the reference horizontal plane R is in the range of about +20° to about +70°. In detail, the angle .theta.2 between the magnetization direction of the third driving unit 730 and the reference horizontal plane R is in the range of about +30° to about +50°.

The fourth driving unit 740 is fixed to the housing 400. In detail, the fourth driving unit 740 may be disposed at the other inner side of the housing 400. In addition, the fourth driving unit 740 may be disposed at the other outer portion of the housing 400. The fourth driving unit 740 may be disposed at the second sidewall 420.

The fourth driving unit 740 faces the third driving unit 730. In addition, the third and fourth driving units 730 and 740 are spaced apart from each other while facing each other. The fourth driving unit 740 may be parallel to the third driving unit 730. A distance d2 between the third and fourth driving units 730 and 740 is in the range of about 50 μm to about 1000 μm, in detail, about 100 μm to about 500 μm The center of the further driving unit 740 may correspond to the center of the third driving unit 730. However, the embodiment is not limited thereto and the center of the fourth driving unit 740 may deviate from the center of the third driving unit 730 by about .+-.20%.

The fourth driving unit 740 may include a coil. That is, the fourth driving unit 740 may be prepared in the form of a coil. In this case, the coil of the fourth driving unit 740 is wound about an axis extending in the second direction. In addition, the coil of the fourth driving unit 740 may be electrically connected to the circuit board 800.

Attractive force or repulsive force may be generated between the third and fourth driving units 730 and 740. The fourth driving unit 740 may apply the attractive force or repulsive force to the third driving unit 730.

The fourth driving unit 740 may apply attractive force or repulsive force to the third driving unit 730 in a direction inclined with respect to the reference horizontal plane R. In this case, the fourth driving unit 740 may apply the magnetic force to the third driving unit 730 at an angle of about −20° to about −70° with respect to the reference horizontal plane R. In detail, the fourth driving unit 740 may apply the magnetic force to the third driving unit 730 at an angle of about −30° to about −50° with respect to the reference horizontal plane R.

In addition, the fourth driving unit 740 may apply the magnetic force to the third driving unit 730 in the second direction as well as the image-side direction. That is, the fourth driving unit 740 may apply the magnetic force to the third driving unit 730 in the lateral downward direction.

The force direction of the third and further driving units 730 and 740 corresponds to the second direction. In detail, the coil of the fourth driving unit 740 may be wound such that the force direction of the third and fourth driving units 730 and 740 may correspond to the second direction. In addition, the coil of the fourth driving unit 740 may be wound in the magnetization direction of the third driving unit 730.

The fifth driving unit 750 is fixed to the lens barrel 100. In detail, the fifth driving unit 750 is fixed inside the lens barrel 100. In more detail, the fifth driving unit 750 is formed at an inner peripheral portion of the lens barrel 100.

Meanwhile, the fifth driving unit 750 is disposed on the peripheral area BA. In detail, the lens barrel 100 further includes a fourth surface 104 facing the second surface 102 and a third edge portion 3EA formed between an edge where the third surface 103 meets the fourth surface 104 and the lens assembly 200. The fifth driving unit 750 is disposed at the third edge portion 3EA and one surface of the fifth driving unit 750 makes contact with the third surface 103.

However, the embodiment is not limited to the above. Referring to FIG. 8, a portion of the fifth driving unit 750 may be disposed at the third edge portion 3EA. That is, a portion of the fifth driving unit 750 may be disposed at the third edge portion 3EA of the lens barrel 100 and remaining portions of the fifth driving unit 750 may be disposed out of the lens barrel 100. Further, referring to FIG. 9, the fifth driving unit 750 may be disposed out of the lens barrel 100. In this case, the fifth driving unit 750 may be disposed corresponding to the third edge portion 3EA of the lens barrel 100.

The fifth driving unit 750 may include a magnetic material. The fifth driving unit 750 may be formed by using the magnetic material. The fifth driving unit 750 may include iron oxide, CoFe2O4 or ferrite.

The fifth driving unit 750 includes a facing surface 751 that faces the lens assembly 200 and the facing surface 751 may have a curvature. That is, the facing surface 751 may be a concave surface formed along a peripheral surface of the lens assembly 200. However, the embodiment is not limited to the above. For instance, the fifth driving unit 750 may have a polygonal column shape, such as a pentagonal column shape.

Since the fifth driving unit 750 is disposed in the peripheral area BA, the space of the lens barrel 100 can be sufficiently utilized and the thickness increase due to the fifth driving unit 750 can be diminished, so that the total volume of the camera module can be reduced.

1 The magnetization direction of the fifth driving unit 750 may be inclined with respect to the optical axis OA. In addition, the magnetization direction of the fifth driving unit 750 may be inclined with respect to the first direction. Further, the magnetization direction of the fifth driving unit 750 may be inclined with respect to the reference horizontal plane R. In detail, the magnetization direction of the fifth driving unit 750 may be set between the first direction and the image-side direction. That is, the magnetization direction of the fifth driving unit 750 may be located in a plane defined by the first direction and the image-side direction.

1 An angle .theta.3 between the magnetization direction of the fifth driving unit 750 and the reference horizontal plane R is in the range of about −20° to about −70°. In detail, the angle .theta.3 between the magnetization direction of the fifth driving unit 750 and the reference horizontal plane R is in the range of about −30° to about −50°.

1 The sixth driving unit 760 is fixed to the housing 400. In detail, the sixth driving unit 760 may be disposed at the other inner side of the housing 400. In addition, the sixth driving unit 760 may be disposed out of the housing 400. The sixth driving unit 760 may be disposed at the third sidewall 430.

1 The sixth driving unit 760 faces the fifth driving unit 750. In addition, the fifth and sixth driving units 750 and 760 are spaced apart from each other while facing each other. The fifth driving unit 750 may be parallel to the sixth driving unit 760. A distance d3 between the fifth and sixth driving units 750 and 760 is in the range of about 50 μm to about 1000 μm, in detail, about 100 μm to about 500 μm 1 The center of the sixth driving unit 760 may correspond to the center of the fifth driving unit 750. However, the embodiment is not limited thereto and the center of the sixth driving unit 760 may deviate from the center of the fifth driving unit 750 by about .+−.20%.

1 The sixth driving unit 760 may include a coil. That is, the sixth driving unit 760 may be prepared in the form of a coil. In this case, the coil of the sixth driving unit 760 is wound about an axis extending in the first direction. In addition, the coil of the sixth driving unit 760 may be electrically connected to the circuit board 800.

1 Attractive force or repulsive force may be generated between the fifth and sixth driving units 750 and 760. The sixth driving unit 760 may apply the attractive force or repulsive force to the fifth driving unit 750.

1 The sixth driving unit 760 may apply attractive force or repulsive force to the fifth driving unit 750 in a direction inclined with respect to the reference horizontal plane R. In this case, the sixth driving unit 760 may apply the magnetic force to the fifth driving unit 750 at an angle of about +20° to about +70° with respect to the reference horizontal plane R. In detail, the sixth driving unit 760 may apply the magnetic force to the fifth driving unit 750 at an angle of about +30° to about +50° with respect to the reference horizontal plane R.

1 In addition, the sixth driving unit 760 may apply the magnetic force to the fifth driving unit 750 in the first direction as well as the object-side direction. That is, the sixth driving unit 760 may apply the magnetic force to the fifth driving unit 750 in the lateral upward direction.

1 The force direction of the fifth and sixth driving units 750 and 760 corresponds to the first direction. In detail, the coil of the sixth driving unit 760 may be wound such that the force direction of the fifth and sixth driving units 750 and 760 may correspond to the first direction. In addition, the coil of the sixth driving unit 760 may be wound in the magnetization direction of the fifth driving unit 750.

Meanwhile, the force direction of the first and second driving units 710 and 720 may correspond to the first direction and the magnetization direction of the first driving unit 710 may be opposite to the magnetization direction of the fifth driving unit 750. This is because the magnetization direction is determined depending on the shape of the first and fifth driving units 710 and 750. That is, since the shape of the fifth driving unit 750 is 180°-symmetrical to the shape of the first driving unit 710 about the first direction, the magnetization direction of the first driving unit 710 is opposite to the magnetization direction of the fifth driving unit 750. Thus, coils of the second and sixth driving units 720 and 760 may be wound in the same direction.

The seventh driving unit 770 is fixed to the lens barrel 100. In detail, the seventh driving unit 770 is fixed inside the lens barrel 100. In more detail, the seventh driving unit 770 is formed at an inner peripheral portion of the lens barrel 100.

Meanwhile, the seventh driving unit 770 is disposed on the peripheral area BA. In detail, the lens barrel 100 further includes a fourth edge portion 4EA formed between an edge where the fourth surface 104 meets the first surface 101 and the lens assembly 200. The seventh driving unit 770 is disposed at the fourth edge portion 4EA and one surface of the seventh driving unit 770 makes contact with the fourth surface 104.

However, the embodiment is not limited to the above. Referring to FIG. 8, a portion of the seventh driving unit 770 may be disposed at the fourth edge portion 4EA. That is, a portion of the seventh driving unit 770 may be disposed at the fourth edge portion 4EA of the lens barrel 100 and remaining portions of the seventh driving unit 770 may be disposed out of the lens barrel 100. Further, referring to FIG. 9, the seventh driving unit 770 may be disposed out of the lens barrel 100. In this case, the seventh driving unit 770 may be disposed out of the lens barrel 100 corresponding to the fourth edge portion 4EA of the lens barrel 100.

The seventh driving unit 770 may include a magnetic material. The seventh driving unit 770 may be formed by using the magnetic material. The seventh driving unit 770 may include iron oxide, $CoFe_2O_4$ or ferrite.

The seventh driving unit 770 includes a facing surface 771 that faces the lens assembly 200 and the facing surface 771 may have a curvature. That is, the facing surface 771 may be a concave surface formed along a peripheral surface of the lens assembly 200. However, the embodiment is not limited to the above. For instance, the seventh driving unit 770 may have a polygonal column shape, such as a pentagonal column shape.

Since the seventh driving unit 770 is disposed in the peripheral area BA, the space of the lens barrel 100 can be sufficiently utilized and the thickness increase due to the seventh driving unit 770 can be diminished, so that the total volume of the camera module can be reduced.

The magnetization direction of the seventh driving unit 770 may be inclined with respect to the optical axis OA. In addition, the magnetization direction of the seventh driving unit 770 may be inclined with respect to the second direction. Further, the magnetization direction of the seventh driving unit 770 may be inclined with respect to the reference horizontal plane R. In detail, the magnetization direction of the seventh driving unit 770 may be set between the second direction and the object-side direction. That is, the magnetization direction of the seventh driving unit 770 may be located in a plane defined by the second direction and the object-side direction.

An angle .theta.4 between the magnetization direction of the seventh driving unit 770 and the reference horizontal plane R is in the range of about +20° to about +70°. In detail, the angle .theta.4 between the magnetization direction of the seventh driving unit 770 and the reference horizontal plane R is in the range of about +30° to about +50°.

The eighth driving unit 780 is fixed to the housing 400. In detail, the eighth driving unit 780 may be disposed at the other inner side of the housing 400. In addition, the eighth driving unit 780 may be disposed out of the housing 400. The eighth driving unit 780 may be disposed at the fourth sidewall 440.

The eighth driving unit 780 faces the seventh driving unit 770. In addition, the seventh and eighth driving units 770 and 780 are spaced apart from each other while facing each other. The seventh driving unit 770 may be parallel to the eighth driving unit 780. A distance d4 between the seventh and eighth driving units 770 and 780 is in the range of about 50 μm to about 1000 μm, in detail, about 100 μm to about 500 μm The center of the eighth driving unit 780 may correspond to the center of the seventh driving unit 770. However, the embodiment is not limited thereto and the center of the eighth driving unit 780 may deviate from the center of the seventh driving unit 770 by about .+−.20%.

The eighth driving unit 780 may include a coil. That is, the eighth driving unit 780 may be prepared in the form of a coil. In this case, the coil of the eighth driving unit 780 is wound about an axis extending in the second direction. In addition, the coil of the eighth driving unit 780 may be electrically connected to the circuit board 800.

Attractive force or repulsive force may be generated between the seventh and eighth driving units 770 and 780. The eighth driving unit 780 may apply the attractive force or repulsive force to the seventh driving unit 770.

The eighth driving unit 780 may apply attractive force or repulsive force to the seventh driving unit 770 in a direction inclined with respect to the reference horizontal plane R. In this case, the eighth driving unit 780 may apply the magnetic force to the seventh driving unit 770 at an angle of about −20° to about −70° with respect to the reference horizontal plane R. In detail, the eighth driving unit 780 may apply the magnetic force to the seventh driving unit 770 at an angle of about −30° to about −50° with respect to the reference horizontal plane R.

In addition, the eighth driving unit 780 may apply the magnetic force to the seventh driving unit 770 in the second direction as well as the image-side direction. That is, the eighth driving unit 780 may apply the magnetic force to the seventh driving unit 770 in the lateral downward direction.

The force direction of the seventh and eighth driving units 770 and 780 corresponds to the second direction. In detail, the coil of the eighth driving unit 780 may be wound such that the force direction of the seventh and eighth driving units 770 and 780 may correspond to the second direction. In addition, the coil of the eighth driving unit 780 may be wound in the magnetization direction of the seventh driving unit 770.

Meanwhile, the force direction of the third and fourth driving units 730 and 740 may correspond to the second direction and the magnetization direction of the third driving unit 730 may be opposite to the magnetization direction of the seventh driving unit 770. This is because the magnetization direction is determined depending on the shape of the third and seventh driving units 730 and 770. That is, since the shape of the seventh driving unit 770 is 180°-symmetrical to the shape of the third driving unit 730 about the second direction, the magnetization direction of the third driving unit 730 is opposite to the magnetization direction of the seventh driving unit 770. Thus, coils of the fourth and eighth driving units 740 and 780 may be wound in the same direction.

The lower coil 900 is disposed at a lower end of the lens barrel 100. In detail, the lower coil 900 is disposed corresponding to the peripheral area BA. Therefore, the lower coil 900 faces the first driving unit 710, the third driving unit 730, the fifth driving unit 750 and the seventh driving unit 770. In addition, the lower coil 900 is spaced apart from the first driving unit 710, the third driving unit 730, the fifth driving unit 750 and the seventh driving unit 770 while facing the first driving unit 710, the third driving unit 730, the fifth driving unit 750 and the seventh driving unit 770. The lower coil 900 may be parallel to the first driving unit 710, the third driving unit 730, the fifth driving unit 750 and the seventh driving unit 770. An interval d5 between the lower coil 900 and the first driving unit 710, the third driving unit 730, the fifth driving unit 750 and the seventh driving unit 770 may be in the range of about 50 μm to about 500 μm Attractive force or repulsive force may be generated between the lower coil 900 and the first driving unit 710, the third driving unit 730, the fifth driving unit 750 and the seventh driving unit 770.

The force direction of the lower coil 900 corresponds to the first direction and the object-side direction, which is perpendicular to the second direction, or the image-side direction. That is, the first driving unit 710, the third driving unit 730, the fifth driving unit 750 and the seventh driving unit 770 may move in the object-side direction or the image-side direction by the lower coil 900.

The lower coil 900 may be wound about an axis extending in the object-side direction or the image-side direction. In addition, the lower coil 900 may be electrically connected to the circuit board 800.

The lower coil 900 may have a thickness in the range of about 100 μm to about 600 μm In addition, the lower coil 900 may have a width in the range of about 100 μm to about 1000 μm The elastic member 300 may have elasticity in the object-side direction, the image-side direction, the first direction and the second direction. That is, the elastic member 300 may have elastic modulus in the object-side direction, the image-side direction, the first direction and the second direction. Thus, the lens barrel 100 may move in the object-side direction, the image-side direction, the first direction and the second direction and return to its initial position due to the elastic member 300.

The camera module according to the embodiment may be operated as follows.

First, if the camera module according to the embodiment is shaken, a shake sensor senses the shake. At this time, the driving units 710, 720 . . . 700N move the lens barrel 100 to compensate for the shake under the control of the control unit.

In this case, the voltage applied to the second driving unit 720 and the sixth driving unit 760 is adjusted to compensate for the first directional component of the shake. In addition, the voltage applied to the fourth driving unit 740 and the eighth driving unit 780 is adjusted to compensate for the second directional component of the shake.

For instance, if the subject moves in the first direction due to the shake, the lens barrel 100 may be tilted in the moving direction of the subject by the first driving unit 710, the second driving unit 720, the fifth driving unit 750 and the sixth driving unit 760.

In addition, if the subject moves in the second direction due to the shake, the lens barrel 100 may be tilted in the moving direction of the subject by the third driving unit 730, the fourth driving unit 740, the seventh driving unit 770 and the eighth driving unit 780.

Further, the camera module according to the embodiment may automatically adjust the focus of the lens assembly 200. That is, the camera module according to the embodiment can increase the distance between the lens assembly 200 and the sensor unit 600 by applying repulsive force to the first driving unit 710, the second driving unit 720, the fifth driving unit 750 and the sixth driving unit 760.

In addition, the camera module according to the embodiment can reduce the distance between the lens assembly 200 and the sensor unit 600 by applying repulsive force to the third driving unit 730, the fourth driving unit 740, the seventh driving unit 770 and the eighth driving unit 780.

In this manner, the camera module according to the embodiment can perform the shake compensation and focus adjustment by inclining the magnetization direction using eight driving units 710 to 780.

As described above, the camera module according to the embodiment can compensate for the hand-shake by driving the lens barrel 100 relative to the housing 400. That is, the driving units 710 to 780 move the lens barrel 100 relative to the housing 400 to compensate for the hand-shake.

In particular, the camera module according to the embodiment applies the magnetic force in the direction inclined with respect to the reference horizontal plane R to move the lens barrel 100. Thus, the camera module according to the embodiment can move the lens barrel 100 in the 3-axis directions. Thus, the camera module according to the embodiment can compensate for the left-right shake and can adjust the focus.

Therefore, the camera module according to the embodiment may perform various functions with a smaller number of components and the size of the camera module can be reduced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens driving apparatus comprising:
a housing;
a barrel provided in the housing;
an elastic member connecting the housing and the barrel;
a magnet provided in the housing and around a central axis of the barrel, the magnet including a first sub magnet, a second sub magnet, a third sub magnet, and a fourth sub magnet;
a first coil includes a first sub coil facing the first sub magnet, a second sub coil facing the second sub magnet, a third sub coil facing the third sub magnet, and a fourth sub coil facing the fourth sub magnet; and
a second coil provided at a lower end of the barrel and facing a lower surface of the magnet,
wherein the magnet and the first coil are overlapped in a horizontal direction that is perpendicular to the central axis of the barrel, and
wherein the magnet and the second coil are overlapped in a vertical direction that is parallel to the central axis of the barrel.

2. The lens driving apparatus of claim 1, wherein the magnet and the first coil are spaced apart from each other in the horizontal direction.

3. The lens driving apparatus of claim 1, wherein the magnet and the second coil are spaced apart from each other in the vertical direction.

4. The lens driving apparatus of claim 1, wherein the first coil includes a first side surface facing an inner surface of the housing and a second side surface opposite to the first side surface, the second side surface facing the magnet.

5. The lens driving apparatus of claim 1, wherein the magnet includes a first side surface facing the first coil and a second side surface facing a side surface of the barrel.

6. The lens driving apparatus of claim 5, wherein the first side surface of the magnet has a flat shape and the second side surface of the magnet has a curvature corresponding to a curvature of side surface of the barrel.

7. The lens driving apparatus of claim 1, wherein the first coil is provided between an inner side surface of the housing and an outer side surface of the magnet.

8. The lens driving apparatus of claim 1, wherein the first coil and the second coil share the magnet to generate attractive force or repulsive force.

9. The lens driving apparatus of claim 1, wherein the first sub magnet, the second sub magnet, the third sub magnet, and the fourth sub magnet surround the barrel.

10. The lens driving apparatus of claim 1, wherein the first coil and the second coil are not overlapped in the vertical direction.

11. The lens driving apparatus of claim 1, wherein a magnetization direction of the magnet is inclined with respect to a reference horizontal plane perpendicular to the vertical direction.

12. The lens driving apparatus of claim 1, wherein the second coil is arranged around an axis parallel to the central axis of the barrel.

13. The lens driving apparatus of claim 1, wherein the magnet includes a flat side surface facing a flat side surface of the first coil, and
wherein the first coil is wound around an axis perpendicular to the flat side surface of the magnet.

14. The lens driving apparatus of claim 1, wherein the first coil is coupled to an inner side surface of the housing.

15. The lens driving apparatus of claim 1, wherein the first coil includes a first flat side surface facing an inner side surface of the housing and a second flat side surface facing a side surface of the magnet.

16. A camera module comprising:
the lens driving apparatus according to claim 1;
an image sensor provided under the lens driving apparatus; and
a circuit board on which the image sensor is mounted.

17. The camera module of claim 16, further comprising:
a shake sensor sensing shake of the camera module; and
a control unit applying a control signal to the first driving module and the second driving module, the first driving module including the first coil and the magnet, the second driving module including the second coil and the magnet, wherein the barrel is moved reference to the image sensor to compensate for the shake under the control of the control unit when the shake sensor senses shaking of the camera module.

18. The camera module of claim 17, wherein the first driving module and the second driving module move the barrel relative to the image sensor.

19. The camera module of claim 16, wherein the barrel is configured to be moved in a first horizontal direction by the first sub coil, the first sub magnet, the third sub coil, and the third sub magnet, wherein the image sensor is stationary, and
wherein the barrel is configured to be moved in a second horizontal direction perpendicular to the first horizontal direction by the second sub coil, the second sub magnet, the fourth sub coil, and the fourth sub magnet, wherein the image sensor is stationary.

20. The camera module of claim 19, wherein a magnetization direction of the magnet is inclined with respect to a reference horizontal plane perpendicular to the vertical direction.

* * * * *